United States Patent [19]

Clin et al.

[11] 4,389,020
[45] Jun. 21, 1983

[54] ROTARY SCREENS

[75] Inventors: Francois H. Clin; Jean-Noel Gony, both of Orleans; Francois O. Proust, Olivet, all of France

[73] Assignee: Bureau de Recherches Geologique et Minieres, Paris, France

[21] Appl. No.: 207,505

[22] Filed: Nov. 17, 1980

Related U.S. Application Data

[60] Continuation of Ser. No. 48,577, Jun. 15, 1979, abandoned, which is a division of Ser. No. 865,663, Dec. 29, 1977, Pat. No. 4,176,799.

[30] Foreign Application Priority Data

Jan. 6, 1977 [FR] France .............................. 77 00262

[51] Int. Cl.³ ........................................... B02G 23/00
[52] U.S. Cl. ........................................ 241/24; 241/26
[58] Field of Search ................ 241/74, 83, 14, 91, 241/171, 24, 182, 284, 26; 209/293, 296, 297, 298, 299

[56] References Cited

U.S. PATENT DOCUMENTS

| | | | |
|---|---|---|---|
| 2,189,711 | 2/1940 | Eigenbrot | 241/91 X |
| 2,721,035 | 10/1955 | Lankford et al. | 241/14 X |
| 3,186,649 | 6/1965 | Haltof | 241/91 X |
| 3,405,873 | 10/1968 | Gothard et al. | 241/91 X |
| 3,614,003 | 10/1971 | Tremolada | 241/79.3 |

Primary Examiner—Mark Rosenbaum
Assistant Examiner—Timothy V. Eley
Attorney, Agent, or Firm—Sughrue, Mion, Zinn, Macpeak and Seas

[57] ABSTRACT

A rotary screen device for sorting refuse material particularly adapted for sorting a mixture of glass and plastics material. The device is generally cylindrical in shape, inclined at a preferred angle to the horizontal, and having three sections, an intake end, a central portion, and an output end. Transverse vanes are arranged in the input end to direct the incoming refuse material towards the central section. The central section includes plural longitudinal vanes which are connected at one end with the transverse vanes in the inlet end and is provided with a uniform distribution of perforations in the regions between the vanes. The outlet end includes no vanes but is provided with peripheral evacuating holes having their largest dimension in a direction perpendicular to the generatrices so that there is no risk of rotating a plastic bottle which could have the effect of an impeller which would drive pieces of glass out of a collection hopper provided below the central section and outlet end.

3 Claims, 5 Drawing Figures

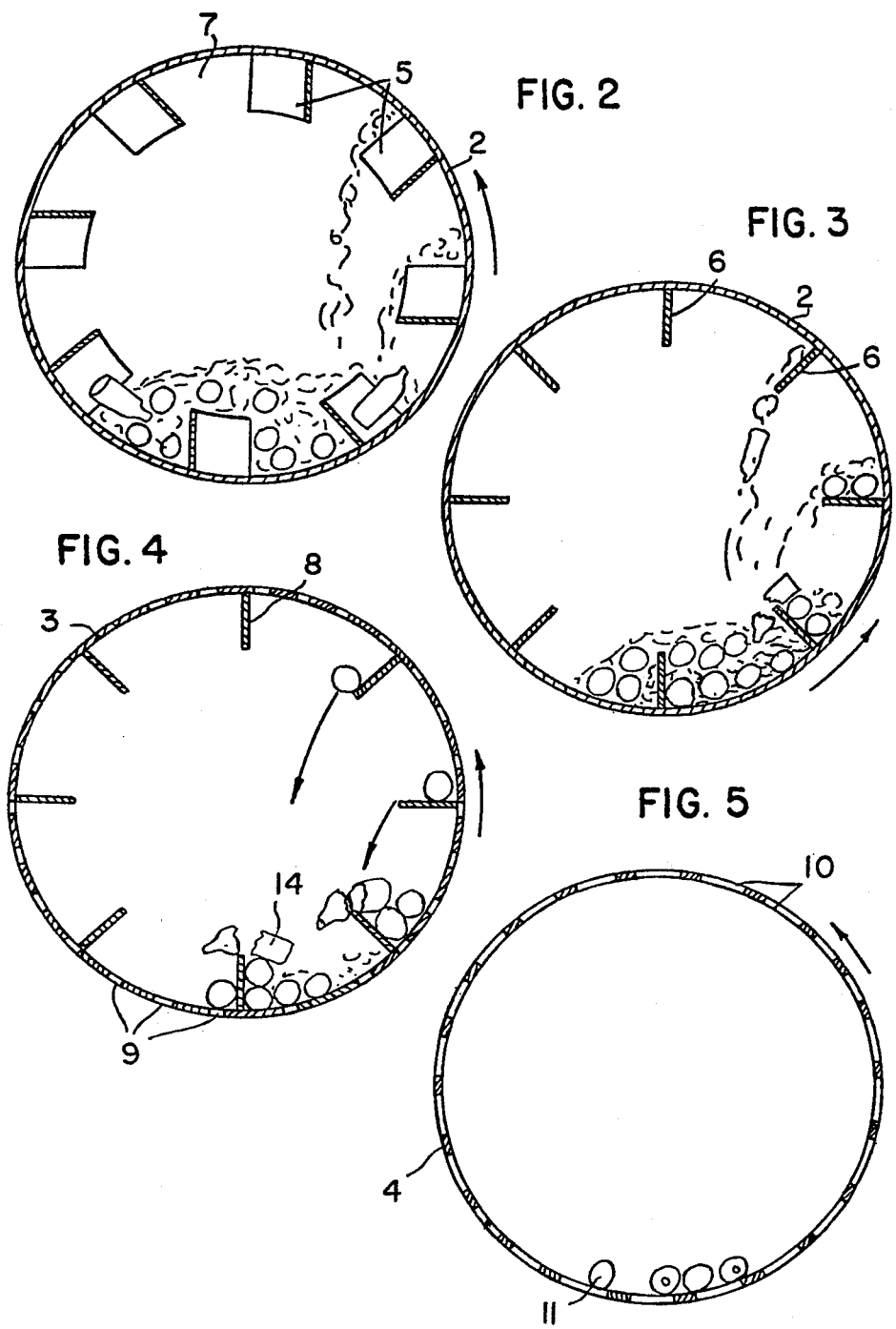

ROTARY SCREENS

This is a Continuation of Ser. No. 48,577, filed June 15, 1979, now abandoned, which is a Divisional of application Ser. No. 865,663, filed Dec. 29, 1977, now U.S. Pat. No. 4,176,799.

The present invention relates to rotary screens designed particularly for permitting continuous sorting of salvage material from a mixture including glass and plastics, by differential crushing and grading, and the invention also relates to processes for sorting refuse material.

There already exist rotary screens comprising a cylinder having an axis inclined to the horizontal, formed of perforated plates and provided internally with baffles and impellers generally disposed along the generatrices of the cylinder. When the cylinder turns on its axis, the products in the vicinity of the impellers, momentarily in low positions, are raised by these impellers until, under the effect of the rotation of the cylinder, the products overflow and drop down, breaking up dependent on their degree of friability and the nature of the other products on which they fall, if they do not strike the impellers.

While it is easy, for example, to deal with material such as raw coal and to effect an initial removal of stones, and certain foreign bodies such as wood or scrap iron, and to screen the product, experiments have shown that it is impossible to use such apparatus for sorting glass when it is intermingled with plastic products, as found, for example, in urban refuse.

It might have been though possible to select a known commercial screen having suitable dimensions and, by modifying the yields, speed of rotation and incline of the apparatus to obtain a more or less satisfactory result, but it has been found that, even by reducing yields, it is not possible to obtain satisfactory separation, of glass and plastics refuse. On the other hand, crushers cannot be used, because the glass debris would become encrusted in the plastics debris, and wear on the apparatus would then be severe.

The object of the present invention is to provide a rotary screen for sorting by differential crushing and grading, so that it can be applied to the sorting of refuse, particularly the sorting of a mixture composed principally of glass and plastics material, which may include complete bottles. Accordingly, such a rotary screen comprises, at its intake end, a complete sleeve-like section internally furnished over its initial length with impellers inclined relative to the generatrices, hereinafter called transverse vanes, and provided, over the remaining length of the sleeve, with longitudinal vanes connected to the transverse vanes. At its output end, the screen comprises a sleeve-like section without vanes on its walls, but perforated with peripheral evacuating holes, the longitudinal vanes of the central body of the perforated cylinder being connected to the longitudinal parts of the intake sleeve.

The combined action of these three parts of the rotary screen has the result of effecting simultaneously an operation for cleaning and distributing products introduced into the intake sleeve, in such manner that all the heavy products tend to break up by simple friction of the heterogeneous materials which surround them, accumulating uniformly about the transverse vanes, said material being taken over by the longitudinal vanes and subjected to this preliminary operation by initial crushing before reaching the central cylindrical body for separation and final crunching.

The result is that, as soon as the products which have been distributed in this manner and have undergone initial crushing and cleaning enter the perforated cylindrical body, they are immediately sorted by elimination of a large portion of the refuse, facilitating the subsequent separation of the initial glass debris liberated by friction or produced by crushing in the intake sleeve. This initial phase leads to a special mode of operation of the central body by the immediate reduction in the level of the products in the area where the vanes are at their lowest level and to an increase in the crushing yield due to the increase in direct impacts on the vanes. Furthermore, the absence of vanes in the perforated outlet sleeve makes it possible to increase the yields to a certain extent by the longitudinal grading of the products, such as plastics bottles, reaching the outlet, and by the peripheral elimination of the last elements having dimensions greater than the calcined glass, that is to say, to glass debris less than 30 mm eliminated by the central body, but less than the dimensions of the plastics bottles.

Another object of the present invention is to increase the output of such apparatus, whilst reducing the consumption of energy per tonne of treated products, as well as reducing wear when the products to be treated contain bottles or elongated bodies. To this end, the spacing of the vanes is made of the order of at least twice the width of a bottle, the width of the vanes being sufficient to support at least one plastic bottle and at the most to sweep over the depth of the mixture covering the base of the cylinder and filling it at an average rate of 20 to 30%. Also, the transverse vanes of the intake sleeve are disposed at 30° to 45° relative to the generatrices, the length thereof being of the order of the length of a bottle, the adjacent longitudinal vanes of the sleeve having a length at least equal to that of one to two bottles.

Experience has shown that it is easy to produce in this manner glass debris with the dimension of calcined glass, that is to say, with a dimension less than approximately 30 mm, without any excess crushing and to produce plastics salvage practically without any associated glass impurity.

Such apparatus is able to tolerate variable compounds, it being easily possible to achieve maximum yield with low consumption of energy by variation of speed and inclination of the cylinder.

Such apparatus can be used for mixtures of materials comprising both friable elements and also non-friable elements; such as food tins, paper, wood etc.

The object of another form of the present invention is to provide a process for sorting mixed materials by means of a rotary screen, by differential crushing and grading, the screen being provided with longitudinal vanes. According to this form of the invention, separation is effected by differential crushing, and grading is preceded by a cleaning and distributing phase of the materials, by compelling at least some of the articles of elongated shape to orientate themselves and to introduce themselves longitudinally between the longitudinal vanes. The separation and crushing phase is then followed by a separation phase without crushing, in the course of which oblong products follow a longitudinal path and the residue of the screening follows a perpendicular path, and by providing a filling co-efficient such that the depth of the materials disposed in the lower part of the apparatus is always less than the width of a crusher.

In order that the invention may readily be carried into practice, one form of apparatus and process using such apparatus will now be described in detail, by way of example, with reference to the accompanying drawings, in which:

FIG. 2 shows a cross-section through the intake sleeve near its end;

FIG. 3 shows a cross-section through the intake sleeve near the central cylinder;

Figure 1:
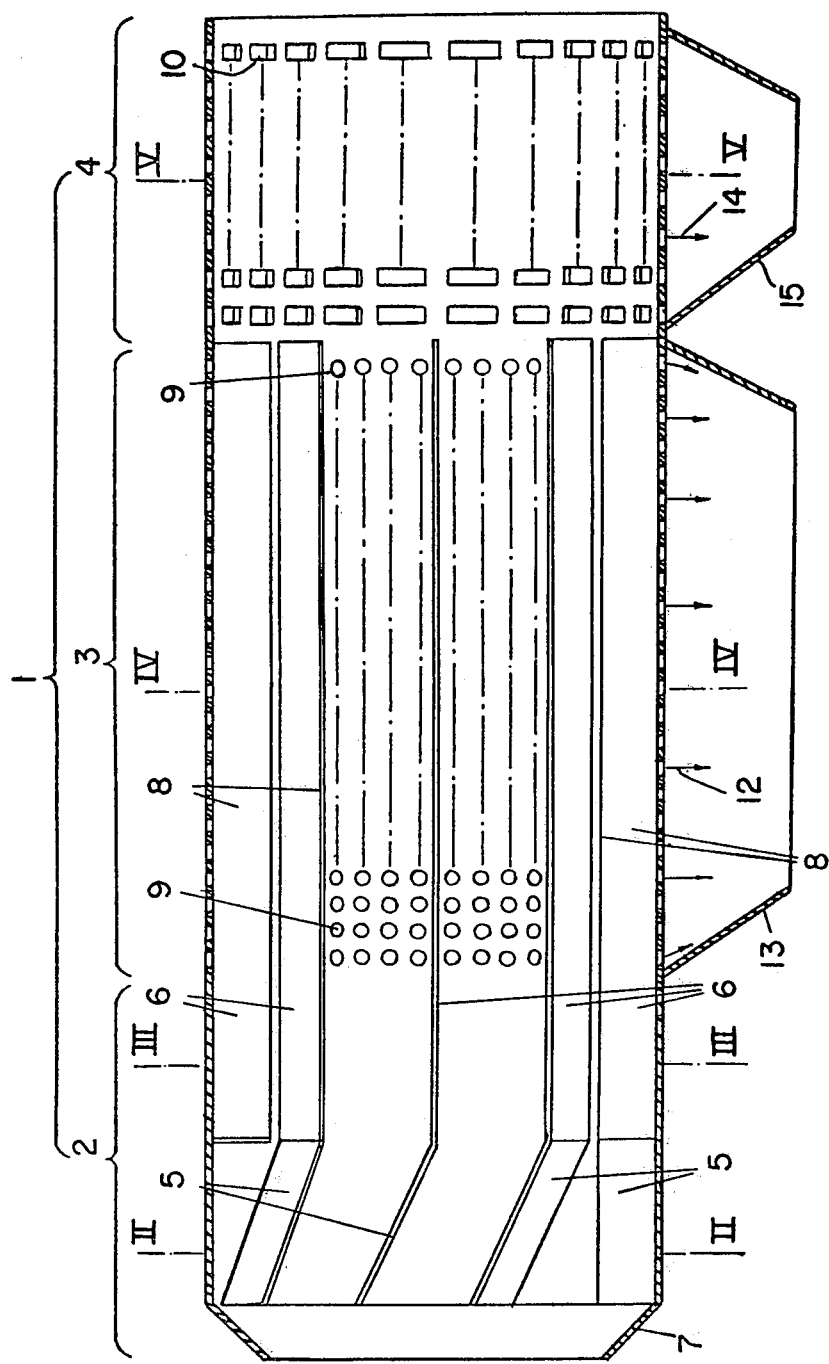
FIG. 1 shows a schematic elevational view through an axial section of the apparatus.

FIG. 4 a cross-section through the central cylinder; and

FIG. 5 shows a cross-section through the outlet sleeve.

As shown in FIG. 1, the apparatus shown generally at 1 comprises substantially an intake sleeve 2, a central body 3 and an outlet sleeve 4.

The inlet sleeve 2 is fitted with an inner series of transverse vanes 5, connected to longitudinal vanes 6. The inlet sleeve 2 has an inlet cone 7, into which the materials to be treated are poured, for instance, by means of a conveyor belt. The non-perforated metal sheeting of the sleeve 2 may, if desired, include any impelling device, otherwise the impelling device is mounted on the central body 3. Since such impelling devices are known and do not form part of the present invention, they are not shown in the drawings.

In this embodiment, the length of the transverse vanes 5 is of the order of 20 to 40 cm and that of the longitudinal vanes 6 is of the order of 40 to 80 cm. The transverse vanes 5 are oriented at an angle $\theta$ in the range of 30°–45° to the longitudinal vanes 6.

The body 3 is perforated and contains longitudinal vanes 8. The perforations 9, preferably distributed uniformly over the length of the cylinder, have a diameter of the order of 30 to 50 mm, in this embodiment. The spacing between the vanes 8 is such that it permits two bottles to be driven freely side by side. The width of the vanes is sufficient to assist the impact of the materials during their fall onto the vanes, but only to sweep over the mixture covering the base of the container when the average filling rate of the cylinder is 20% to 30%.

The outlet sleeve 4 can comprise only one row of openings 10 having dimensions greater than the largest pieces of glass capable of resisting crushing on account of their thickness; necks or bottoms of bottles, for example.

When the materials begin to be fed in, they are as shown in FIG. 2, the transverse vanes 5 urging the products with a shovelling movement towards the interior.

FIG. 3 shows the operation of the longitudinal vanes 6, before the materials penetrate into the screening zone formed by the central body 3.

FIG. 4 shows the phase of separation, towards the central part of the cylinder 3. Although the proportion of plastic bottles 11 increases relatively to glass 14, it will be seen that bottles 14 continue to fall onto the ends of the vanes 8, the available surfaces of the vanes increasing with the disappearance of calcined glass 12, FIG. 1, which drops into a hopper 13.

In the final portion of travel of material, as shown in FIG. 5, the absence of vanes within the sleeve 4 facilitates the positioning of plastic bottles 11 on the bottom of the sleeve parallel to the generatrices, in addition to evacuation thereof beyond the row of perforations 10, the smallest dimension of which is preferably parallel to the generatrices.

Glass debris 14, FIG. 1, which is larger than the calcined glass 12 collected at 13, drops into a hopper 15. By orienting the largest dimension of the perforations in the sleeve in a direction perpendicular to the generatrices, any further risk is avoided of rotating a plastic bottle, the neck of which might become engaged in a perforation and would have the effect of an impeller, driving pieces of glass beyond the hopper 15.

The described apparatus is capable of numerous modifications of detail and can be used to treat mixtures of very different kinds. Instead of containing glass and plastics bottles, the mixture can be formed by large potsherds, fragments of glass, tiles or pottery, even with a large proportion of gravel and earth, or by plastics bottles made of polyvinyl chloride capable of being broken into smaller or larger portions. In this case, the slope and the speed of rotation can be reduced to obtain the separation of glass and plastics materials. If, on the contrary, all the bottles are complete, more than two tonnes of such a mixture can be easily treated per hour with an apparatus of small dimensions and by adjusting its slope to a value of the order of 3.5° for a speed of rotation of the order of 23 t/m.

It is obvious that, according to the treated mixtures which may be extremely diverse, it would be possible to separate from calcined glass several materials carried along therewith; such as: gravel, capsules of polyethylene, paper or the like, capable of presenting themselves, according to their size, to the hoppers 13 and 15 or even to the outlet of the sleeve 4. Whatever the mixture is, the presence of the intake and outlet sleeves increases to a considerable extend the yield of the apparatus by the automatic adjustment of the speed of the products, even when the treated lots vary discontinuously in granulometry and percentage of the products of the mixture.

What we claim is:

1. A process for salvaging material by means of a rotary screen rotating about a longitudinal axis, utilizing differential crushing and grading of mixed materials, said screen being provided with longitudinal vanes, comprising the steps of; cleaning and distributing the mixed materials; separating by differential crushing and grading of said mixed materials; orienting at least some articles of elongated shape among the mixture to introduce themselves in alignment with and between the longitudinal vanes; separating articles without crushing, by having articles of elongated shaped follow a longitudinal path and the screening residue follow a path substantially perpendicular to said longitudinal path; and providing a filling rate coefficient such that the depth of the products in a bottom longitudinally extending portion of the screen is always less than the width of a vane.

2. A sorting process as claimed in claim 1, wherein the cleaning and distribution phase of the products is effectuated by setting said products into a non-axial shovelling and thrust movement of means of vanes inclined by 30° to 45° relative to the general direction of circulation of the products, and the crushing phase with separation of the products is effectuated at the beginning of separation by adjusting the width of the vanes of the screen so that they at the most sweep over the depth of materials located in said bottom longitudinally extending portion of the screen, when the filling rate of the screen is of the order to 20% to 30% of inlet capacity.

3. A sorting process as claimed in claim 1, for products containing elongated bodies, further comprising the step of adjusting the distance between consecutive vanes to permit engagement of at least two of the elongated bodies side by side and the width of the vanes is adjusted so that said width is at least greater than the width of the widest elongated bodies.

* * * * *